(12) United States Patent
Finan et al.

(10) Patent No.: US 8,255,502 B2
(45) Date of Patent: Aug. 28, 2012

(54) DYNAMIC DOMAIN ADMINISTRATION UTILITY

(75) Inventors: Robert Finan, Scottsdale, AZ (US); Joel Silverstein, Demarest, NJ (US)

(73) Assignee: Oracle International Corporation, Redwood Shores, CA (US)

( * ) Notice: Subject to any disclaimer, the term of this patent is extended or adjusted under 35 U.S.C. 154(b) by 1321 days.

(21) Appl. No.: 10/848,426

(22) Filed: May 18, 2004
(Under 37 CFR 1.47)

(65) Prior Publication Data
US 2006/0168169 A1    Jul. 27, 2006

(51) Int. Cl.
*G06F 15/173* (2006.01)

(52) U.S. Cl. ........................ 709/223; 709/228

(58) Field of Classification Search ........... 709/223–229
See application file for complete search history.

(56) References Cited

U.S. PATENT DOCUMENTS

| | | | |
|---|---|---|---|
| 5,781,743 A * | 7/1998 | Matsuno et al. | 709/228 |
| 6,101,527 A * | 8/2000 | Lejeune et al. | 709/201 |
| 6,205,464 B1 * | 3/2001 | Cobb et al. | 718/101 |
| 6,266,698 B1 * | 7/2001 | Klein et al. | 709/227 |
| 6,446,134 B1 * | 9/2002 | Nakamura | 719/313 |
| 6,598,067 B1 * | 7/2003 | Wydra et al. | 718/100 |
| 6,601,095 B1 * | 7/2003 | Duffield et al. | 709/222 |
| 6,886,169 B2 * | 4/2005 | Wei | 719/316 |
| 7,139,805 B2 * | 11/2006 | Seagren et al. | 709/207 |
| 7,185,221 B1 * | 2/2007 | Kamel | 714/4 |
| 2002/0116205 A1 * | 8/2002 | Ankireddipally et al. | 705/1 |
| 2002/0194263 A1 * | 12/2002 | Murren et al. | 709/203 |
| 2003/0078972 A1 * | 4/2003 | Tapissier et al. | 709/204 |
| 2003/0088659 A1 * | 5/2003 | Susarla et al. | 709/223 |
| 2003/0195997 A1 * | 10/2003 | Ibert et al. | 709/318 |
| 2003/0202112 A1 * | 10/2003 | Bowman et al. | 348/261 |
| 2004/0039612 A1 * | 2/2004 | Fitzgerald et al. | 705/5 |
| 2004/0158837 A1 * | 8/2004 | Sengodan | 719/313 |
| 2005/0131994 A1 * | 6/2005 | Chang et al. | 709/203 |
| 2005/0144267 A1 * | 6/2005 | Maron | 709/223 |

OTHER PUBLICATIONS

BEA Systems, Inc. (BEA); Dynamically Modifying Systems; Jul. 5, 1999.*
BEA Systems, Inc. (BEA); Limitations on Dynamic Modification Using tmconfig; 2000.*
BEA Systems, Inc. (BEA); Dynamic Modification Methods; 2000.*
BEA Systems, Inc. (BEA); Introducing BEA Tuxedo; 2008.*

* cited by examiner

*Primary Examiner* — Brian P Whipple
(74) *Attorney, Agent, or Firm* — Fliesler Meyer LLP

(57) ABSTRACT

The Weblogic Tuxedo Connector is used to provide interoperability between Tuxedo and applications such as Weblogic Server. In one embodiment, WTC may implement operations such as list, start, or stop WTC Tuxedo session connections. In WTC, the configuration is set up so that multiple WTC-Tuxedo connections are defined as part of a WTCServerMBean. In one embodiment, the present invention includes a feature for providing WTC with the ability to individually perform actions to connections, such as start or stop a WTC-Tuxedo connection, without affecting other connections defined in the MBean.

26 Claims, 2 Drawing Sheets

---

Providing a plurality of connections between the application server architecture and the distributed transaction processing system 200

↓

Performing an action on a first connection of the plurality of connections, wherein performing an action includes terminating the first connection of the plurality of connections, the remainder of the connections not affected by the termination of the first connection 202

DYNAMIC DOMAIN ADMINISTRATION UTILITY

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Field of the Invention

The current invention relates generally to dynamic domain connectors and administration.

Background of the Invention

Tuxedo by BEA Systems of San Jose, Calif., is a reliable and scalable platform for simplifying distributed transaction processing and message-based application development in a multi-language environment. WebLogic Server (WLS), also by BEA Systems, provides an application infrastructure for developing, integrating, securing, and managing distributed service-oriented applications. A Weblogic Tuxedo Connector (WTC) has been developed to allow old versions of Tuxedo and WLS to access Tuxedo features.

Previously, an administrator specifies the connection configuration between WTC and Tuxedo by defining any number of WTCRemoteTuxDom and WTCLocalTuxDom MBeans. A LocalAccessPoint attribute of the WTCRemoteTuxDom-MBean indicates which WTCLocalTuxDomMBean it will connect to and the ConnectionPolicy attribute on both MBeans determines when the connection will be made. These MBeans are defined within the scope of a WTCServerM-Bean. When the WTCServerMBean is deployed, a WTCService starts and all connections will be ready and started according to the respective local/remote ConnectionPolicy attributes. Additionally, at that time the entire configuration for imported services (WTCImportMBean), exported services (WTCExportMBean), passwords (WTCPasswordM-Bean), and global resources (WTCResourcesMBean) are also in use. When the WTCServerMBean is undeployed the WTCService is shutdown, all connections are stopped, and all the configured services are no longer available.

Customers using WTC today do not have the ability to start and stop individual WTC-Tuxedo connections from the WTC side of the connection. This capability is only available as part of the Tuxedo dmadmin utility. This control is inadequate in a production system where many connections are running simultaneously and some may be needed at the same time another should be terminated. What is needed is a system and method to allow an administrator to have control of individual connections without involving deployment or undeployment of a WTCServerMBean.

SUMMARY OF THE INVENTION

The Weblogic Tuxedo Connector is used to provide interoperability between Tuxedo and applications such as Weblogic Server. In one embodiment, WTC may implement operations such as list, start, or stop WTC Tuxedo session connections. In WTC, the configuration is set up so that multiple WTC-Tuxedo connections are defined as part of a WTCServerMBean. In one embodiment, the present invention includes a feature for providing WTC with the ability to individually perform actions to connections, such as start or stop a WTC-Tuxedo connection, without affecting other connections defined in the MBean.

DETAILED DESCRIPTION

Figure 1:
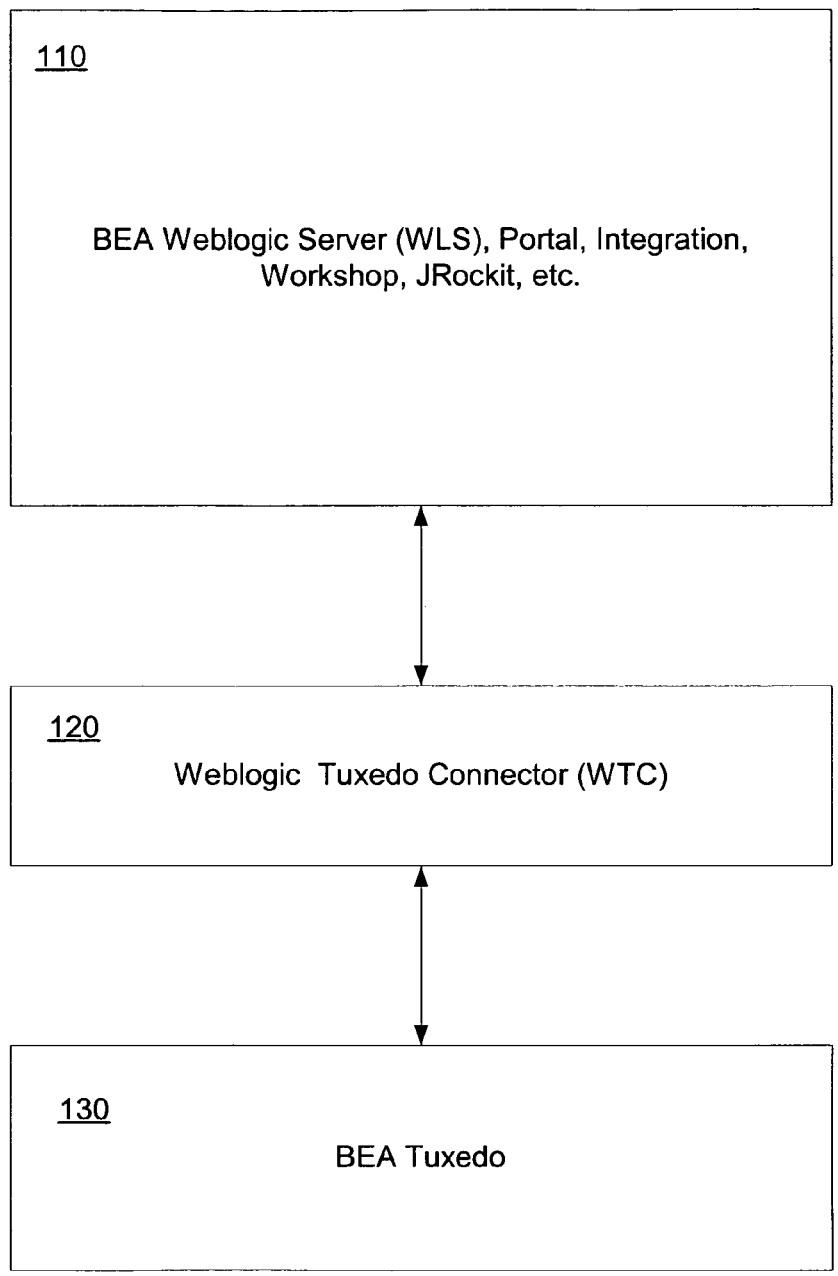
FIG. 1 is an illustration of a system for providing interoperability between WLS and Tuxedo using WTC in accordance with one embodiment of the present invention.
Figure 2:
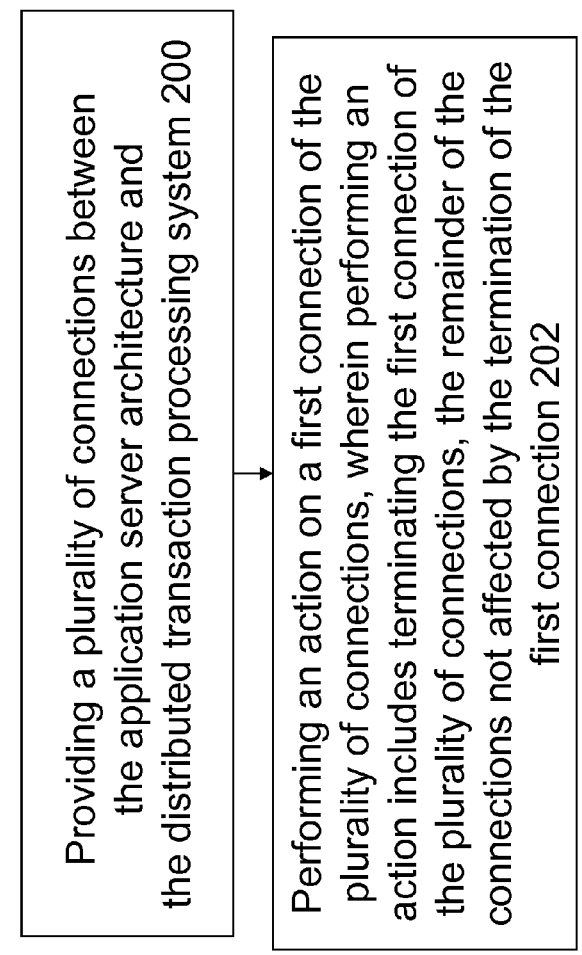
FIG. 2 is an illustration of an embodiment of the present invention.

As illustrated in the system 100 FIG. 1, the Weblogic Tuxedo Connector (WTC) 120 is used to provide interoperability between Tuxedo 130 and WLS and other BEA applications 110. In one embodiment of the present invention, the operations that will be available from WTC will be to list, start, or stop WTC Tuxedo session connections. In WTC, the configuration is set up so that multiple WTC-Tuxedo connections are defined as part of a WTCServerMBean. In order to stop one of the connections this MBean is undeployed but this then effects all the connections defined. In one embodiment, the present invention includes a feature for providing WTC with the ability to individually start or stop a WTC-Tuxedo connection without affecting other connections defined.

Some terms used herein are defined as follows:

WTC—WebLogic Tuxedo Connector connection—WTC-Tuxedo session connection supporting the Tuxedo domain protocol OA&M—Operations, Administration & Management WTCLocalTuxDom—configuration MBean for specifying the local side in Tuxedo domain protocol communication WTCRemoteTuxDom—configuration MBean for specifying the remote side in Tuxedo domain protocol communication AccessPointId—configuration MBean attribute used for Tuxedo domain session connection names JATMI—The application to transaction monitor interface defined for WTC tBridge—Application built on WTC for providing JMS-Tuxedo queuing features WTCServerMBean deployed—MBean is targeted to a WLS server. Starts WTCService.

Session connections initialized and started if required.

WTC ServerMBean undeployed—MBean is targeted to a WLS server. Starts

WTCService. Session connections initialized and started if required.

As mentioned above in one embodiment, the present invention includes a feature for providing WTC with the ability to individually start or stop a WTC-Tuxedo connection without affecting other connections defined. This means that when an administrator needs to make a configuration change, do remote platform maintenance, or debug a problem involving a lone connection, only that connection is affected and all other configured services are still available.

Thus, an administrator to start or stop individual connections and list configured combinations. In addition to support for this feature, dynamic configuration changes will also be permitted. In one embodiment, all the operations of the present invention are executable through the console or through the WebLogic Scripting Tool.

The operations that will be available from this utility will be to list, start, or stop WTC<=>Tuxedo session connections. Arguments used with these operations, when required, will be the AccessPointId of the end points for a connection. The AccessPointId will correspond to WTCLocalTuxDom-MBean and WTCRemoteTuxDomMBean configuration attributes. In one embodiment of the present invention, command line scripting will replace JMX command line execution. Thus, the two ways that will be supported for executing this utility will be through the console or through the WebLogic Scripting Tool.

In one embodiment, the list operation will dump out all the connections configured and the status of the connection (for example, whether the connection is or is not connected). No arguments will be needed. The output will show the AccessPointId names of each connection's end points and each connection's status.

The start operation, if successful, will create a connection between the remote and local access points specified. A log message will also be sent to the WLS log for the successful connection. If no WTCRemoteTuxDom AccessPointId is specified then all remote end points, specified for connecting to the given WTCLocalTuxDom AccessPointId, will be chosen for attempted connection. If the WTCLocalTuxDom or WTCRemoteTuxDom MaxRetries attribute is set then a connection retry will occur automatically. Since the utility uses the same code as in a WTC connection, a failure may occur for the same reasons (e.g. security, protocol, hardware, or invalid message). If it does fail to connect, it will throw an exception message containing the same WTC TPException info. In one embodiment, some of the reasons for an exception during a start connection operation are as follows:

AccessPointId name must be less than 30 characters
The domain session is marked as terminated and cannot be connected
The domain session is already marked as connected
Could not read message from remote domain
Was not able to get authorization parameters from the remote Tuxedo domain
The message received contained an improper opcode
The security level of the remote Tuxedo domain does not match the local level
The protocol level of the message received is not supported
The protocol level of the message received requires the Interoperate attribute to be set
A link level encryption negotiation failure occurred
Failure during send of link level encryption message to remote Tuxedo domain
Failure during read of link level encryption message from remote Tuxedo domain
Unable to generate the required diffie-hellman packet
The message is missing appropriate security object
Unable to acquire credentials from security object
Unable to get context from security object
Unable to receive security exchange from remote Tuxedo domain
A security violation occurred during processing of data received
Unable to get authentication level
Unable to setup security authentication and auditing The stop operation, if successful, will disconnect an existing connection between the WTCLocalTuxDom AccessPointId and the WTCRemoteTuxDom AccessPointId. It will also properly mark the session as terminated, clean up resources, and remove the WTC domain connection session from the WTC domain registry. If no WTCRemoteTuxDom AccessPointId is specified then all remote end points, specified for connecting to the given WTCLocalTuxDom AccessPointId, will be chosen for attempted disconnect. If automatic retry processing is enabled then it will be disabled for this operation. If the stop connection operation is not successful, an IOException has occurred and the exception detail will be logged.

In one embodiment, addition and deletion of the configuration MBeans or modification of their attributes will be permitted while the WTCService is running. These changes will not be propagated to running connections but will be observable when the connection is restarted. Furthermore, if the attribute to be changed is part of a local domain, remote domain, imported or exported service, or password that is currently referenced by a running connection, the configuration change will be disallowed until that specific connection has been stopped. Inclusion of this dynamic configuration update capability does not mean that only simple changes are allowed. Rather, dynamic deletion or addition of domain session end points may be performed as well.

In one embodiment, the following programming interfaces may be used in accordance with the present invention.

```
public interface WTCServerRuntimeMBean extends RuntimeMBean {
    Collection DSessConnInfo listConnectionsConfigured( );
    void startConnection(String LDomAccessPointId, String RDomAcessPointId);
    void startConnection(String LDomAccessPointId);
    void stopConnection(String LDomAccessPointId, String RDomAcessPointId);
    void stopConnection(String LDomAccessPointId);
}
public class DSessConnInfo {
    String getLocalAccessPointId( );
    String getRemoteAccessPointId( );
    boolean isConnected( );
}
```

A series of examples of different embodiments of the present invention will now be discussed.

In one embodiment, an example may relate to a Remote Platform Upgrade, wherein the primary user during this scenario is a System Administrator and the secondary user is a WebLogic Administrator. For this example, the administrator has determined that the throughput for service availability is unacceptable. The offending platform has been determined to have major problems. It is observed that the platform is configured as a remote domain in a WTC configuration, is responsible for providing Tuxedo services to WLS applications, and is part of a running WTCService. A replacement platform is configured to provide the same Tuxedo services and the administrator is now ready to switch the new platform in and the old one out of the WTC configuration. The workflow for this example may go as follows:

A new WTCRemoteTuxDom is added to the WTCServerMBean configured info
The new WTC utility is executed to list the configured connections
The local and remote access points are shown with a status of not connected
The WTCImport MBean is modified to get its service from the new WTCRemoteTuxDom
The original WTCRemoteTuxDom MBean is deleted and WTC updates are finished.
The administrator than goes to work on the remote platform In another embodiment, an example may relate to a Diagnose log overflow, wherein the primary user during this scenario is am IT Operator and the secondary user is a WebLogic Administrator. In this case, the administrator has told the IT Operator that the logs are getting filled up with the same WTC service information message. The IT Operator is to determine who are sending the messages, stop it, and then report results so that the logs may be checked for any additional pertinent details. The workflow for this example may go as follows:

- The operator checks the WTC configuration to see which WTCImport has the service
- From the WTCImport the operator then sees what LocalAccessPoint is used for the WTC end point and which RemoteAccessPointList ids may be the Tuxedo end point
- The new WTC utility is executed to list the configured connections
- The operator identifies the local and remote access points that show a status of connected
- The operator then executes the utility stop connection operation providing the local and remote AccessPointId as arguments
- The operator again executes the list operation, sees the connection stopped and reports back to the administrator.

In another embodiment, an example may relate to testing new installation configuration, wherein the primary user during this scenario is a WebLogic Administrator and the secondary user is a System Administrator. In this case, a WebLogic Administrator has been told that Tuxedo has been installed on a platform. The administrator is provided with the dmconfig information from the Tuxedo platform and told to follow the naming conventions used there. In order to have the Tuxedo services available to WLS applications the first step must be to add the WTC configuration information and test to make sure that both sides have valid end point information.

- The administrator adds a WTCServerMBean, two WTCLocalTuxDom, ten WTCRemoteTuxDom and five WTCImport MBeans to the WLS configuration
- The administrator deploys the WTCServerMBean and the WTCService is started without error
- The new WTC utility is executed to list the configured connections
- The administrator notes which end points are connected and which are not.
- The administrator verifies that the connected end points are configured with the ON_STARTUP ConnectionPolicy
- The administrator then uses the new connect operation to test each of the end points that were not connected.
- All configurations connect correctly so the administrator undeploys the WTCServerMBean and starts to add the new applications.

As illustrated in the system 100 FIG. 1, the Weblogic Tuxedo Connector (WTC) 120 is used to provide interoperability between Tuxedo 130 and WLS and other BEA applications 110. In one embodiment of the present invention, the operations that will be available from WTC will be to list, start, or stop WTC Tuxedo session connections. In WTC, the configuration is set up so that multiple WTC-Tuxedo connections are defined as part of a WTCServerMBean. In order to stop one of the connections this MBean is undeployed but this then effects all the connections defined. In one embodiment, the present invention includes a feature for providing WTC with the ability to individually start or stop a WTC-Tuxedo connection without affecting other connections defined.

Other features, aspects and objects of the invention can be obtained from a review of the figures and the claims. It is to be understood that other embodiments of the invention can be developed and fall within the spirit and scope of the invention and claims.

The foregoing description of preferred embodiments of the present invention has been provided for the purposes of illustration and description. It is not intended to be exhaustive or to limit the invention to the precise forms disclosed. Obviously, many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications.

Included in the programming (software) of the general/specialized computer or microprocessor are software modules for implementing the teachings of the present invention, including, but not limited to, implementing a dynamic domain administration utility system and method.

The invention claimed is:

1. A method for managing connections between distributed transaction processing domains from an application server, comprising:

associating the application server with a distributed transaction processing server in a first distributed transaction processing domain, the first distributed transaction processing domain communicates with a second distributed transaction processing domain using a plurality of connections;

defining the plurality of connections, between the first distributed transaction processing domain and the second distributed transaction processing domain, as part of a server configuration object that targets the application server, wherein the server configuration object includes a plurality of connection configuration objects, and each connection configuration object of the plurality of connection configuration objects defines and manages one connection of the plurality of connections; and performing an action on a connection of the plurality of connections, through the server configuration object from the application server, without affecting other connections in the plurality of connections, wherein the action is performed through at least one of adding, modifying and deleting one or more connection configuration objects that are associated with the connection, wherein the one or more connection configuration objects are part of the plurality of connection configuration objects in the server configuration object.

2. The method of claim 1, further comprising listing the plurality of connections.

3. The method of claim 1, further comprising allowing the action to be executable through a console or through a scripting tool.

4. The method of claim 1, further comprising allowing arguments for the action to be end points for a connection.

5. The method of claim 1, further comprising dumping out all configured connections and status of configured connections in a list action.

6. The method of claim 5, further comprising showing names of each connection's end points and each connection's status.

7. The method of claim 1, further comprising allowing a start action to create a connection between remote and local access points.

8. The method of claim 1, further comprising allowing a stop action to disconnect an existing connection between remote and local access points.

9. The method of claim 1, further comprising dynamically deleting or adding domain session end points.

10. The method of claim 1, further comprising automatically performing a connection retry for one connection of the plurality of connections until a maximum number of retry is reached for the connection, wherein the maximum number of retry is defined by an attribute in a configuration object that is associated with the connection, wherein different maximum number of retry can be defined for different connections.

11. The method of claim 1, further comprising:
configuring a first connection configuration object that associates a first connection with a remote domain that provides a transaction service;
determining that the first connection is unacceptable;
configuring a second connection configuration object that associates a second connection to a replacement domain that also provides the transaction service;
deleting the first configuration object; and
connecting to the replacement domain to use the transaction service.

12. The method of claim 1, further comprising:
creating a connection based on a local access configuration object and a remote access configuration object, wherein the local access configuration object defines a local access point in the first distributed transaction processing domain and the remote access configuration object defines a remote access point in the second distributed transaction processing domain.

13. The method of claim 1, further comprising:
modifying of one or more attributes of the server configuration object while a connection is running.

14. The method of claim 1, further comprising:
specifying a first domain configuration object for the first distributed transaction processing domain;
specifying a second domain configuration object for the second distributed transaction processing domain; and
corresponding an access point attribute in the first domain configuration object with an access point attribute in the second domain configuration object for each connection.

15. The method of claim 1, further comprising:
specifying a service import configuration object to get a service from a remote distributed transaction processing domain.

16. A non-transitory computer-readable storage medium, including instructions stored thereon which when read and executed by a computer cause the computer to perform steps comprising:
associating the application server with a distributed transaction processing server in a first distributed transaction processing domain, the first distributed transaction processing domain communicates with a second distributed transaction processing domain using a plurality of connections;
defining the plurality of connections, between the first distributed transaction processing domain and the second distributed transaction processing domain, as part of a server configuration object that targets the application server, wherein the server configuration object includes a plurality of connection configuration objects, and each connection configuration object of the plurality of connection configuration objects defines and manages one connection of the plurality of connections; and
performing an action on a connection of the plurality of connections, through the server configuration object from the application server, without affecting other connections in the plurality of connections, wherein the action is performed through at least one of adding, modifying and deleting one or more connection configuration objects that are associated with the connection, wherein the one or more connection configuration objects are part of the plurality of connection configuration objects in the server configuration object.

17. The non-transitory computer-readable storage medium of claim 16, wherein dynamic deletion or addition of domain session end points is permitted while a connection is running.

18. The non-transitory computer-readable storage medium of claim 16, wherein operations available from the plurality of connections include list, start, and stop.

19. The non-transitory computer-readable storage medium of claim 18, wherein operations are executable through a console or through a scripting tool.

20. The non-transitory computer-readable storage medium of claim 18, wherein arguments for an operation are end points for a connection.

21. The non-transitory computer-readable storage medium of claim 18, wherein a list operation will dump out all configured connections and status of configured connections.

22. A system, comprising:
an application server;
a distributed transaction processing server in a first distributed transaction processing domain;
a connection service between the application server and the first distributed transaction processing system, the connection service manages a plurality of connections between the first distributed transaction processing domain and a second distributed transaction processing domain;

a server configuration object, on the connection service, that targets the application server, the server configuration object includes a plurality of connection configuration objects, each connection configuration object of the plurality of connection configuration objects defines and manages one connection of the plurality of connections, wherein, using the server configuration object from the application server, an action can be performed on a connection of the plurality of connections, without affecting other connections in the plurality of connections, and the action is performed through at least one of adding, modifying and deleting one or more connection configuration objects that are associated with the connection, wherein the one or more connection configuration objects are part of the plurality of connection configuration objects in the server configuration object.

23. The system of claim 22, wherein the connection service permits dynamic deletion or addition of domain session end points while a connection is running.

24. The system of claim 22, wherein operations available from the plurality of connections include list, start, and stop.

25. The system of claim 24, wherein the operations are executable through a console or through a scripting tool.

26. The system of claim 24, wherein arguments for an operation are end points for a connection.

* * * * *

UNITED STATES PATENT AND TRADEMARK OFFICE
CERTIFICATE OF CORRECTION

| | | |
|---|---|---|
| PATENT NO. | : 8,255,502 B2 | Page 1 of 1 |
| APPLICATION NO. | : 10/848426 | |
| DATED | : August 28, 2012 | |
| INVENTOR(S) | : Finan et al. | |

It is certified that error appears in the above-identified patent and that said Letters Patent is hereby corrected as shown below:

In column 3, line 60, delete "auditing" and insert -- auditing. --, therefor.

In column 4, line 28, delete "RDomAcessPointId);" and insert -- RDomAccessPointId); --, therefor.

In column 4, line 31, delete "RDomAcessPointId);" and insert -- RDomAccessPointId); --, therefor.

Signed and Sealed this
Eighteenth Day of December, 2012

David J. Kappos
*Director of the United States Patent and Trademark Office*